United States Patent
Liu (10) Patent No.: US 8,540,423 B2
(45) Date of Patent: Sep. 24, 2013

(54) SEMICONDUCTOR TEMPERATURE SENSOR WITH HIGH SENSITIVITY

(75) Inventor: Bo Liu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 468 days.

(21) Appl. No.: 12/147,008

(22) Filed: Jun. 26, 2008

(65) Prior Publication Data

US 2008/0279254 A1    Nov. 13, 2008

Related U.S. Application Data

(62) Division of application No. 11/328,694, filed on Jan. 4, 2006, now Pat. No. 7,405,552.

(51) Int. Cl.
   G01K 7/00 (2006.01)
   G01K 7/01 (2006.01)
   G01K 7/14 (2006.01)

(52) U.S. Cl.
   USPC ............... 374/178; 374/170; 374/1; 374/172; 702/99; 702/130; 327/513

(58) Field of Classification Search
   USPC ............. 374/1, 170–173, 178; 702/130–136, 702/99; 327/512–513; 323/299, 234; 330/256, 330/289
   See application file for complete search history.

(56) References Cited

U.S. PATENT DOCUMENTS

| | | | | |
|---|---|---|---|---|
| 3,795,919 | A | * | 3/1974 | Aho ................................. 2/423 |
| 3,873,857 | A | * | 3/1975 | Farrish .......................... 327/512 |
| 3,996,451 | A | * | 12/1976 | Harrington et al. ............. 377/25 |
| 4,106,341 | A | * | 8/1978 | Serrano ......................... 374/173 |

(Continued)

FOREIGN PATENT DOCUMENTS

EP        504974 A1 *  9/1992
JP       08184505 A  *  7/1996

OTHER PUBLICATIONS

"Low-Voltage Analog Temperature Sensors in SC70 and SOT23 Packages." Product Specification, Maxim Integrated Products (2001).

(Continued)

*Primary Examiner* — Gail Verbitsky

(74) *Attorney, Agent, or Firm* — Schwegman, Lundberg & Woessner, P.A.

(57) ABSTRACT

An temperature sensor circuit is disclosed. In one embodiment, the temperature sensor comprises an input circuit with a current mirror for forcing a current down a reference stage and an output stage. The reference stage and the output stage include P-N junctions (e.g., using bipolar transistors) with differing junction potentials. By tailoring the resistances in the reference and output stages, the input circuit produces two output voltages, one of which varies predictably with temperature, and one which is stable with temperature. The input circuit is preferably used in conjunction with an amplifier stage which preferably receives both the temperature-sensitive and non-temperature-sensitive outputs. Through various resistor configurations in the amplifier stage, the output of the temperature sensor can be made to vary at a higher sensitivity than produced by the temperature-sensitive output of the input circuit. Moreover, as a result of the non-temperature-sensitive output, the output of the temperature sensor is additionally and beneficially tailored in its offset voltage in a temperature-independent manner. The result is a flexible circuit that can achieve very high sensitivities and near-ideal performance even at lower power supply voltages.

28 Claims, 7 Drawing Sheets

(56) References Cited

U.S. PATENT DOCUMENTS

| | | | |
|---|---|---|---|
| 4,114,421 A * | 9/1978 | Beall | 374/25 |
| 4,246,542 A * | 1/1981 | Thanos | 330/107 |
| 4,433,923 A * | 2/1984 | Rascati et al. | 374/112 |
| 4,475,103 A * | 10/1984 | Brokaw et al. | 340/501 |
| 4,636,092 A * | 1/1987 | Hegyi | 374/178 |
| 4,760,285 A * | 7/1988 | Nelson | 327/511 |
| 4,799,041 A | 1/1989 | Layton | |
| 4,986,131 A * | 1/1991 | Sugiyama et al. | 73/766 |
| 5,053,692 A * | 10/1991 | Craddock | 323/365 |
| 5,085,526 A * | 2/1992 | Sawtell et al. | 374/101 |
| 5,226,733 A * | 7/1993 | Mitchell et al. | 374/172 |
| 5,659,264 A * | 8/1997 | Ariyoshi et al. | 327/513 |
| 5,795,069 A * | 8/1998 | Mattes et al. | 374/183 |
| 5,961,215 A * | 10/1999 | Lee et al. | 374/178 |
| 6,037,832 A * | 3/2000 | Kaminishi | 327/538 |
| 6,087,821 A | 7/2000 | Kojima | 323/315 |
| 6,111,396 A | 8/2000 | Lin et al. | |
| 6,147,908 A | 11/2000 | Abugharbieh et al. | |
| 6,154,087 A * | 11/2000 | Ito | 327/512 |
| 6,157,244 A * | 12/2000 | Lee et al. | 327/539 |
| 6,183,131 B1 * | 2/2001 | Holloway et al. | 374/178 |
| 6,236,320 B1 * | 5/2001 | Senba | 340/584 |
| 6,345,238 B1 | 2/2002 | Goodwin | 702/130 |
| 6,412,977 B1 | 7/2002 | Black et al. | |
| 6,468,825 B1 | 10/2002 | Machida et al. | 438/48 |
| 6,489,831 B1 | 12/2002 | Matranga et al. | 327/512 |
| 6,570,371 B1 | 5/2003 | Volk | |
| 6,630,754 B1 * | 10/2003 | Pippin | 307/117 |
| 6,726,361 B2 * | 4/2004 | Bisping et al. | 374/178 |
| 6,775,638 B2 * | 8/2004 | Gauthier et al. | 702/130 |
| 6,778,453 B2 * | 8/2004 | Martin et al. | 365/212 |
| 6,795,343 B2 | 9/2004 | Marotta et al. | |
| 6,847,254 B2 * | 1/2005 | Pai | 327/572 |
| 6,867,470 B1 | 3/2005 | Lorenz | 257/470 |
| 6,876,250 B2 * | 4/2005 | Hsu et al. | 327/539 |
| 6,879,141 B1 | 4/2005 | Ho | 323/315 |
| 6,882,135 B2 | 4/2005 | Andoh et al. | |
| 6,917,237 B1 * | 7/2005 | Tschanz et al. | 327/513 |
| 6,952,130 B2 * | 10/2005 | Kuyel et al. | 330/9 |
| 6,997,606 B2 * | 2/2006 | Marinet et al. | 374/178 |
| 7,033,072 B2 * | 4/2006 | Aota et al. | 374/178 |
| 7,075,847 B2 * | 7/2006 | Kim et al. | 365/222 |
| 7,140,767 B2 * | 11/2006 | McLeod et al. | 374/178 |
| 7,225,099 B1 * | 5/2007 | O'Dwyer | 702/130 |
| 7,388,418 B2 * | 6/2008 | Reffay | 327/513 |
| 7,405,552 B2 * | 7/2008 | Liu | 323/314 |
| 7,427,158 B2 * | 9/2008 | Yoshida | 374/172 |
| 7,504,813 B2 * | 3/2009 | Manstretta | 323/312 |
| 7,621,671 B2 * | 11/2009 | Petruzzi et al. | 374/170 |
| 7,991,571 B2 * | 8/2011 | Laraia et al. | 702/99 |
| 2004/0095187 A1 * | 5/2004 | Li | 327/539 |
| 2004/0146086 A1 * | 7/2004 | Gauthier et al. | 374/170 |
| 2004/0252749 A1 * | 12/2004 | Randazzo | 374/178 |
| 2006/0093016 A1 * | 5/2006 | McLeod et al. | 374/178 |
| 2006/0197581 A1 * | 9/2006 | Chun et al. | 327/512 |
| 2006/0262827 A1 * | 11/2006 | Hsu | 374/1 |
| 2007/0001744 A1 * | 1/2007 | Miranda et al. | 327/512 |
| 2007/0055473 A1 * | 3/2007 | McLeod | 702/130 |
| 2008/0031304 A1 * | 2/2008 | Nishimura | 374/178 |
| 2008/0252360 A1 * | 10/2008 | Yoshikawa | 327/512 |
| 2009/0110022 A1 * | 4/2009 | Snyder et al. | 374/1 |
| 2009/0146725 A1 * | 6/2009 | Kimura | 327/512 |
| 2010/0264980 A1 * | 10/2010 | Arguello | 327/513 |

OTHER PUBLICATIONS

"DS56 Dual Temperature Comparator." Product Specification, Dallas Semiconductor (1999).

D. Johns & K. Martin, "Analog Integrated Circuit Design," John Wiley & Sons, Inc., pp. 354-355, 360-361 (1997).

* cited by examiner

SEMICONDUCTOR TEMPERATURE SENSOR WITH HIGH SENSITIVITY

CROSS REFERENCE TO RELATED APPLICATIONS

This is a divisional application of U.S. Ser. No. 11/328,694, filed Jan. 4, 2006, to which priority is claimed and which is incorporated herein by reference in its entirety.

FIELD OF THE INVENTION

Embodiments of this invention relate to a temperature sensor with high output voltage sensitivity and the ability to function at low power supply voltages over wide temperature ranges.

BACKGROUND

Temperature sensors are well known in the integrated circuit art. Typically, a temperature sensor provides an output voltage whose magnitude equates to the temperature that the circuit senses.

Figure 1:
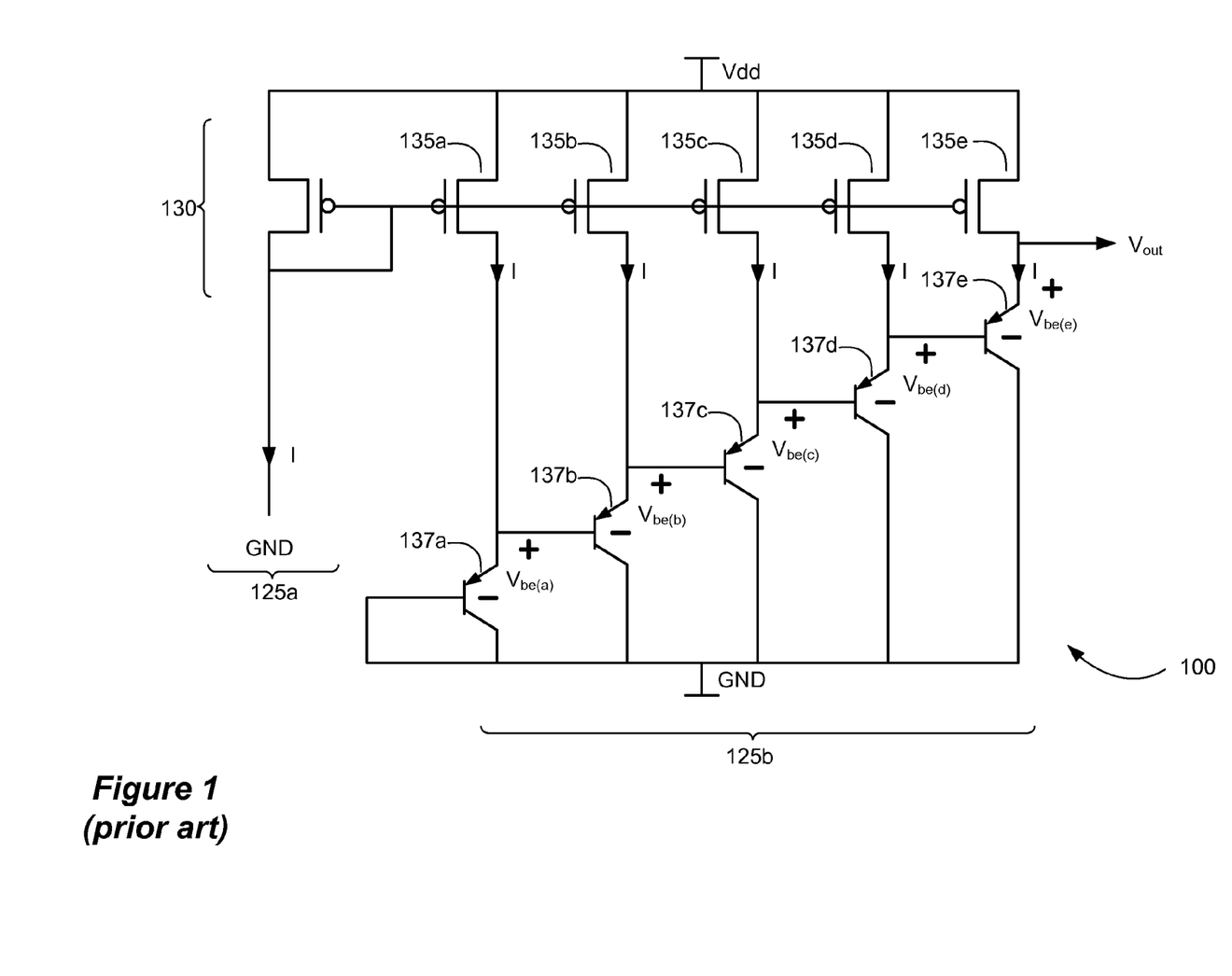
FIG. 1 illustrates a prior art temperature sensor circuit.

One temperature sensor 100 is shown in FIG. 1, and is taken from U.S. Pat. No. 6,867,470 as a good illustration of the problems indicative of prior art temperature sensors. As shown, temperature sensor 100 includes a current mirror 130 comprised of P-channel transistors 135a-e in (in this case) five output stages 125b, each of which passes the input of I. This current from each stage is met by five PNP (bipolar) transistors 137a-e, which comprise in effect 5 P-N junctions in series. The base-to-emitter voltage of these P-N junctions, $V_{be(a)-(e)}$, is a function of temperature, and essentially such voltage changes by about −2 mV per every degree Celsius. Aside from this temperature dependence, the $V_{be}$ for each junction is on the order of about 0.6 Volts at room temperature (25 degrees Celsius). Accordingly, the output voltage, $V_{out}$ is on the order of 3.0V (0.6V*the five stages), and its sensitivity is on the order of about −10 mV/C (−2 mV*5).

More stages could be used to increase the temperature sensor 100's sensitivity, but this comes at a price. While each junction added to the circuit adds sensitivity (i.e., another −2 mV/C worth at the output), it also adds another 0.6V drop. Accordingly, as more and more junctions are used, the power supply voltage, Vdd, must be increased accordingly. For example, for the temperature sensor 100 of FIG. 1 to function as desired over an appropriate temperature range (e.g., −50 to 100 degrees C.), the power supply voltage must be at least 3.5V (i.e., about 3.0V for the P-N junctions and another 0.5V for proper $V_{ds}$ voltage drops across the current mirror transistors 135). But this is an unfortunate limitation, especially when considering that many modern-day integrated circuits have power supply voltages that are lower than 3.5V. This minimum power supply limitation can be alleviated by removing some of the stages/junctions from the circuitry 100, but this comes at the price of reduced sensitivity. In other words, temperature sensor circuits of the prior art tend to offer either high sensitivities, or flexible power supply operating values, but not both as would be desirable.

It is therefore a goal of this disclosure to provide embodiments of temperature sensors that are both highly sensitive over extended temperature ranges and capable of working at wider power supply ranges and in particular at low power supply values.

SUMMARY

An temperature sensor circuit is disclosed. In one embodiment, the temperature sensor comprises an input circuit. The input circuit comprises a current mirror for forcing a current down a reference stage and an output stage. The reference stage and the output stage include P-N junctions (e.g., using bipolar transistors) with differing junction potentials. By tailoring the resistances in the reference and output stages, the input circuit produces two output voltages, one of which varies predictably with temperature, and one which is stable with temperature.

While the input circuit is useful as a temperature sensor in its own right and is particularly useful in its additional provision of a non-temperature-sensitive output, the input circuit is preferably used in conjunction with an amplifier stage. The amplifier stage can comprise a number of different amplifiers (e.g., operational amplifiers), and preferably receives both the temperature-sensitive and non-temperature-sensitive outputs. Through various resistor configurations in the amplifier stage, the output of the amplifier stage (i.e., the output of the temperature sensor) can be made to vary at a higher sensitivity than produced by the temperature-sensitive output of the input circuit. Moreover, as a result of the non-temperature-sensitive output, the output of the temperature sensor is additionally and beneficially tailored in its offset voltage in a temperature-independent manner. The result is a flexible circuit that can achieve very high sensitivities at lower power supply voltages. Indeed, the disclosed temperature sensor circuit can achieve near-ideal performance over a temperature range between first and second temperatures in which the temperature sensor output is approximately the power supply voltage at the first temperature, and is approximately ground at the second temperature.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 2:
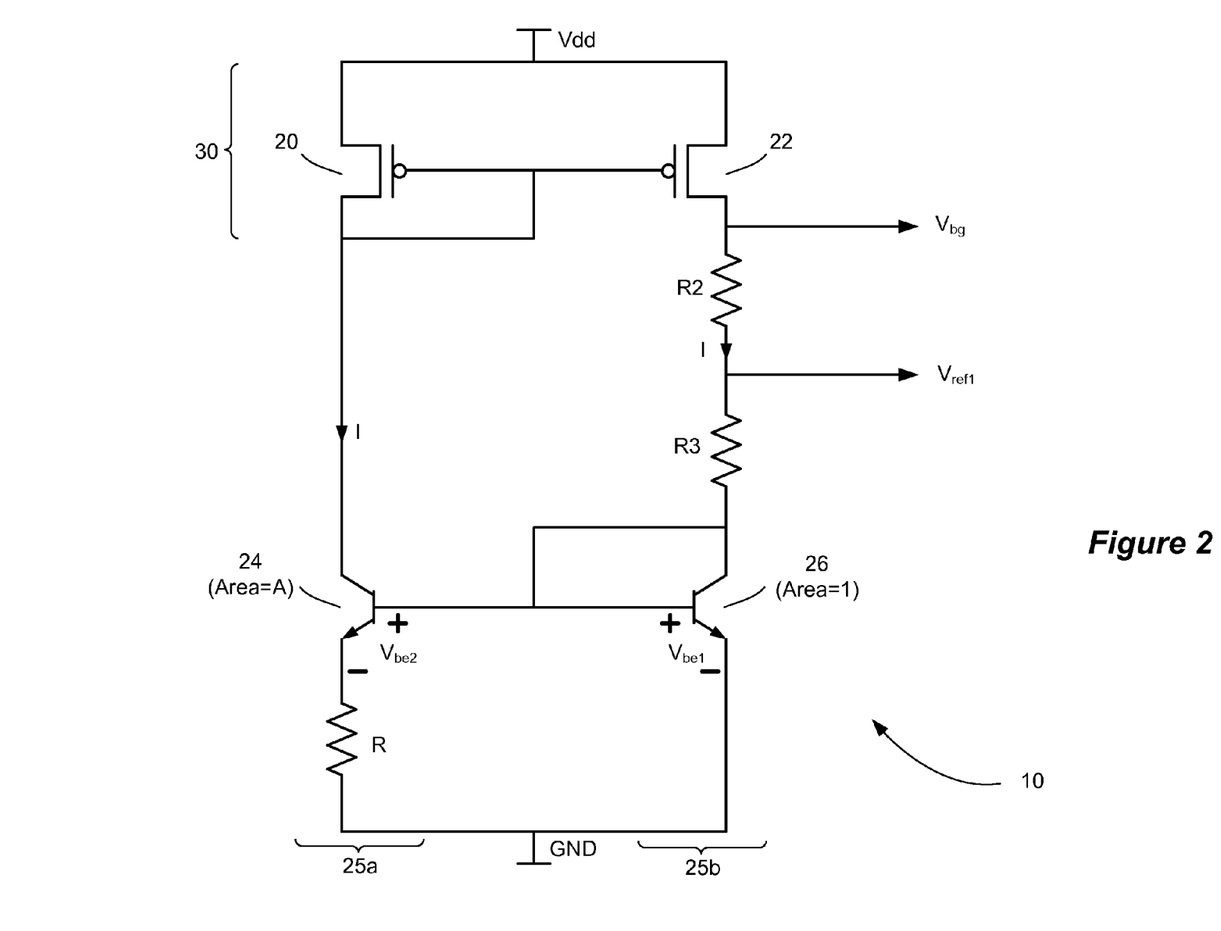
FIG. 2 illustrates an input circuit used in preferred embodiments of the disclosed temperature sensors, and comprises a temperature-sensitive output voltage and a temperature-insensitive output voltage.

FIG. 2 discloses an input circuit 10 as can be used in embodiments of the temperature sensor circuitry disclosed herein, and which will be discussed later. As shown, the input circuit 10 comprises a current mirror circuit 30, comprised of P-channel transistors 20 and 22. This arrangement forces a reference current, I, down both reference stage 25a and output stage 25b. Output stage 25b comprises two resistors, R2 and R3, with outputs $V_{bg}$ and $V_{ref1}$ tapping at either end of resistor R2. An NPN (bipolar) transistor 26 is also present in the output stage 25b, and given its common collector-base configuration is essentially configured as a junction or diode. The bias to the base of transistor (junction) 26 is also used to bias the base of NPN transistor (junction) 24 in the reference stage.

When this circuit arrangement in hand, one skilled in the art will appreciate that certain mathematical equations describe the operation of the input circuit 10:

$$V_{bg} = I*(R2+R3) + V_{be1} \qquad (1)$$

$$V_{ref1} = I*R3 + V_{be1} \qquad (2)$$

$$\Delta V_{be} = V_{be1} - V_{be2} = kT\ln(A)/q \qquad (3)$$

$$I = \Delta V_{be}/R = kT\ln(A)/qR \qquad (4)$$

$$\partial V_{bg}/\partial T = \partial/\partial T\{(kT\ln(A)/qR)*(R2+R3)\} + \partial V_{be1}/\partial T \qquad (5)$$
$$= (k\ln(A)/q*R)*(R2+R3) + \partial V_{be1}/\partial T$$

$$\partial V_{ref1}/\partial T = \partial/\partial T\{(kT\ln(A)/qR*R3\} + \partial V_{be1}/\partial T \qquad (6)$$
$$= (k\ln(A)/qR)*R3 + \partial V_{be1}/\partial T$$

where k=Boltzmann constant (8.62×10$^{-5}$ eV/K), q=electronic charge (1.60×10$^{-19}$ coul), A=the ratio in base-emitter area between the NPN transistors 24 and 26. To briefly explain these equations, Equations (1), (2), and (4) set forth the basic ohms law characteristics of the two stages 25a and 25b; Equation (3) is known (that the difference in the junction potentials $V_{be1}-V_{be2}=\Delta V_{be}=kT\ln(A)/q$ is explained in Johns & Martin, "Analog Integrated Circuit Design," pp. 360-61 (John Wiley & Sons, 1997), which is incorporated herein by reference); and equations (5) and (6) comprise the temperature differentials of Equations (1) and (2).

In a preferred embodiment, the two outputs of input circuit 10, $V_{bg}$ and $V_{ref1}$, are preferably different in terms of their temperature dependencies. Specifically, it is preferred that output $V_{bg}$ not be dependent on temperature, such as is the case with a band gap reference circuit. In other words, it is preferred that $\partial V_{bg}/\partial T=0$. Conversely, it is preferred that output $V_{ref1}$ be dependent on temperature, as would be necessary for the input circuit 10 to have functionality as a temperature sensor. For example, while $\partial V_{ref1}/\partial T$ can be tailored depending on the values of the resistors used, assume for now that it is preferable for $\partial V_{ref1}/\partial T=-1.9$ mV/C.

With values for these two output voltage temperature differentials set, and by empirically observing that $\partial V_{be1}/\partial T=-2$ mV/C as discussed above, relations between the three resistor values R, R2, and R3 can be established by plugging $\partial V_{bg}/\partial T=0$, $\partial V_{ref1}/\partial T=-0.0019$, and $\partial V_{be1}/\partial T=-0.002$ into equations (5) and (6). Specifically:

$$R2/R=0.0019q/k\ln(A) \qquad (7)$$

$$R3/R=0.000q/k\ln(A) \qquad (8)$$

$$R2/R3=19 \qquad (9)$$

In other words, choosing resistor values in these relative proportions will provide outputs from the input circuit 10 with the desired temperature characteristics, i.e., with $V_{bg}$ not varying with temperature and with $V_{ref1}$ varying –1.9 mV/C with temperature.

Note that resistor R3 is small, and generally it can be omitted from circuit. This is shown by noting that when $\partial V_{bg}/\partial T=0$ and $\partial V_{ref1}/\partial T=-0.0019$ are plugged into equations (5) and (6), the R3 term falls out. However, R3 can still be used to set a temperature sensitivity (e.g., $\partial V_{ref1}/\partial T=-0.0019$) that is different from the temperature sensitivity of the P-N junction (i.e., –0.002).

Input circuit 10 therefore comprises a temperature sensor in its own right, and is unique in its output of an output voltage indicative of temperature ($V_{ref1}$) and also in its simultaneous output of a temperature stable reference voltage ($V_{bg}$). However, as used by itself, input circuit 10 has a relatively low temperature sensitivity ($\partial V_{ref1}/\partial T=-1.9$ mV/C). However, it beneficially operates at low power supply voltages (e.g., less than 1.5V), because only one junction 26 is present in the circuit.

In any event, while input circuit 10 is novel and useful in its own right, preferred embodiments of the invention use the input circuit as an input stage to various amplifier stages to follow. As will be appreciated, when the input circuit is used in conjunction with the amplifier stages, the result is a temperature sensor circuit with high sensitivities and the capability to run at low power supply voltages and over wide temperature ranges.

Figure 3:
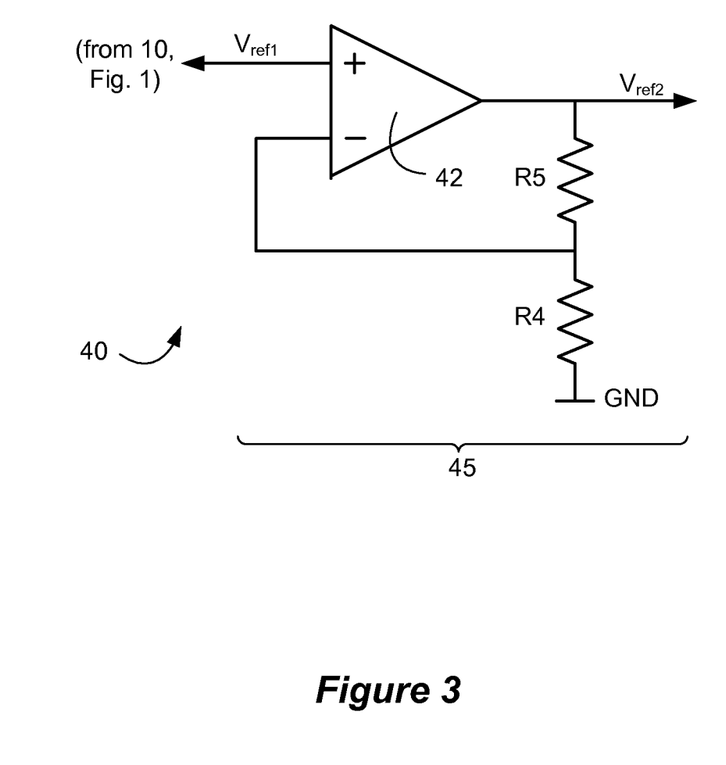
FIG. 3 illustrates one embodiment of a temperature sensor using the input circuit of FIG. 2, in which the temperature sensor uses an amplifier stage to improve the temperature sensor's sensitivity.

A first embodiment of a temperature sensor circuit 40 that uses the input circuit 10 in conjunction with an amplifier stage 45 is shown in FIG. 3. Temperature sensor 40 uses an operational amplifier (op amp) 42, to which is input only the temperature-dependent output $V_{ref1}$ from input circuit 10. The voltage divider formed by R5 and R4, which is fed back to the inverting input of the op amp 42, establishes the output $V_{ref2}$ of the temperature sensor 40 as follows:

$$V_{ref2}=(R5+R4)/R4*V_{ref1}=n*V_{ref1} \qquad (10)$$

$$\partial V_{ref2}/\partial T=n*\partial V_{ref1}/\partial T \qquad (11)$$

where the scalar n=(R5+R4)/R4.

Thus by choosing R4 and R5 appropriately, n can be set to a value such as 1.7. With the values of the resistors so chosen, note that the sensitivity of the temperature sensor 40, i.e., $\partial V_{ref2}/T$, equals, 1.7*–1.9 mV/C=–3.2 mV/C. Note further that this sensitivity value is possible at lower power supply voltages (e.g., Vdd=1.5V); such sensitivity at low power supply voltages were not possible using the prior art circuit of FIG. 1, because such sensitivity required the use of multiple serially-connected junctions, which in turn require higher power supply values to function.

Figure 4:
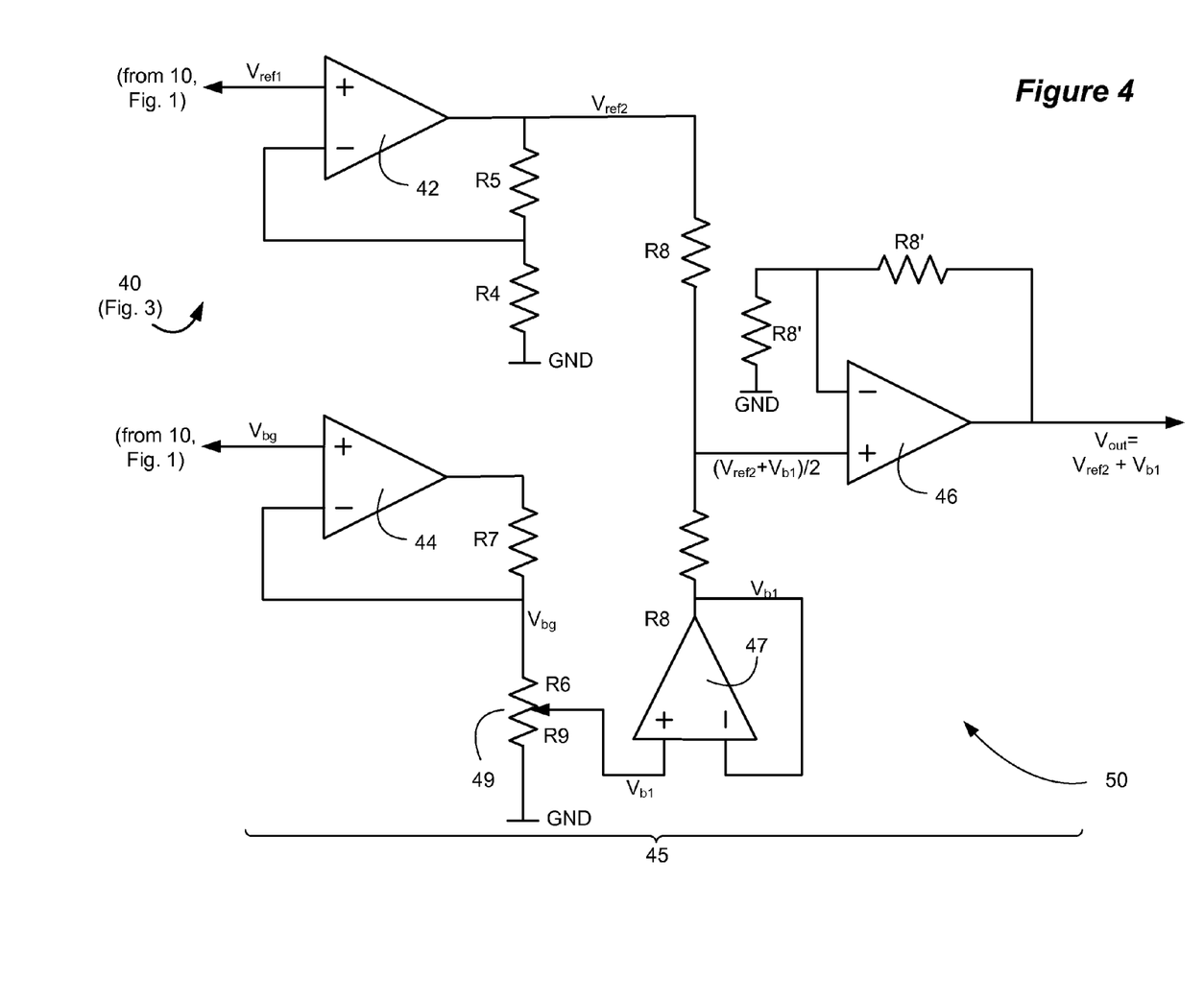
FIG. 4 illustrates another embodiment of a temperature sensor similar to that of FIG. 3, but which includes additional amplifier stages and uses the temperature-insensitive output voltage of the input circuit to control an offset of the temperature sensor's output voltage.

FIG. 4 shows another embodiment of a temperature sensor 50. In this embodiment, the temperature sensor 40 of FIG. 3 is used, but additionally, the amplifier stage 40 includes further op amps 44 and 46. Op amp 44 receives as in input the temperature-independent output $V_{bg}$ from the input circuit 10. As configured, temperature sensor 50 is similar in its function to temperature sensor 40, but the output of the sensor ($V_{out}$) includes a controllable offset ($V_{b1}$). In other words, $V_{out}=V_{ref2}+V_{b1}$, where $V_{b1}$ is a controllable bias voltage. Specifically, $V_{b1}=(R9/(R6+R9))*V_{bg}$, where R6 and R9 comprise the resistance to either side of $V_{b1}$ tap of variable resistor 49. Variable resistor 49 may be one-time programmed to set R6 and R9 during manufacture, or may be controllable via control signals (not shown, but well within the understanding of one skilled in the art). The voltage at the input of the non-inverting input of op amp 46 is $(V_{ref2}+V_{b1})/2$ as established by voltage divider resistors R8. Because op amp 46 will encourage this same voltage at the inverting terminal of op amp 46, the output voltage of twice this amount ($V_{out}=V_{ref2}+V_{b1}$) is established by virtue of voltage divider resistors R8'.

Figure 5:
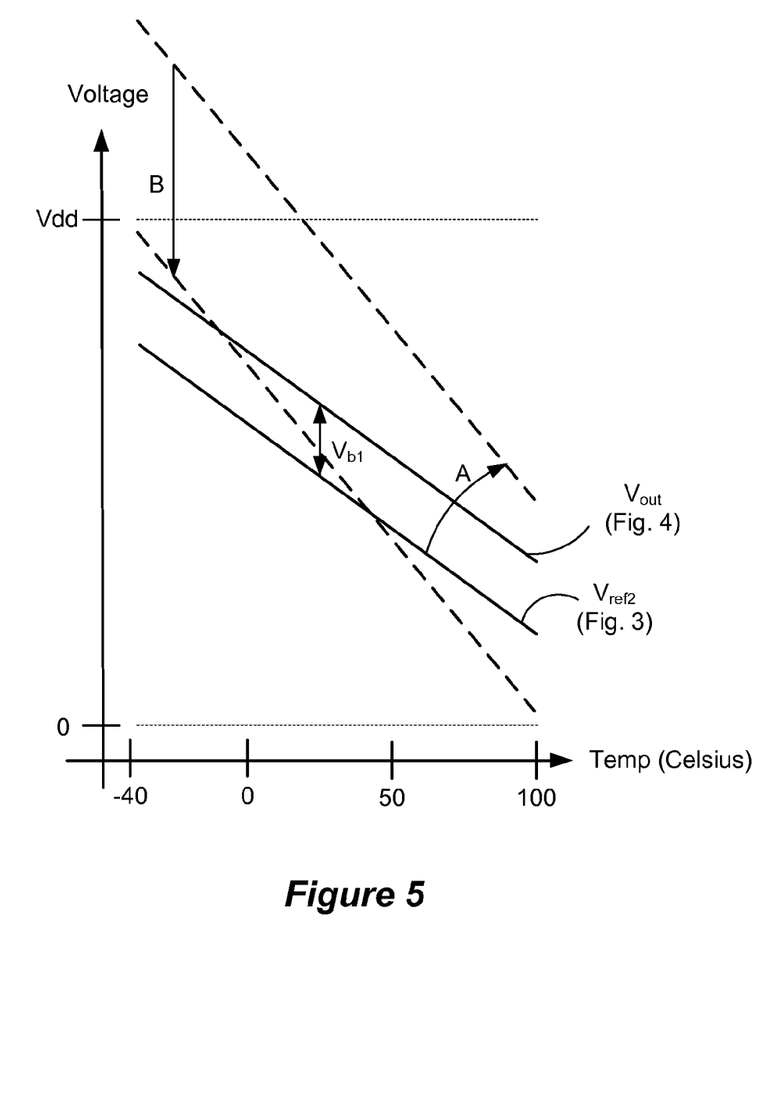
FIG. 5 graphically illustrates differences in the output voltage offset for the temperature sensors of FIGS. 3 and 4, and also illustrates problems associated with limited power supply voltages.

Because $V_{bg}$ is not dependent on temperature, neither is $V_{b1}$. Of course, $V_{ref2}$ is temperature dependent, as explained with reference to temperature sensor 40 of FIG. 3. Because the output $V_{out}$ of the temperature sensor 50 equals $V_{ref2}+V_{b1}$, the magnitude of the output voltage is scalable by a temperature-independent offset. In other words, the temperature sensor 50 of FIG. 4 allows for the same temperature sensitivity in its output as is formed by the temperature sensor 40 of FIG. 3, but at a different magnitude, as shown in FIG. 5. This ability to adjust the offset of the output without the worry of adding unforeseen temperature dependence can provide improved design flexibility. The ability to adjust the offset is further useful should process variations require the output voltages to be modified from chip to chip or from wafer to wafer.

As noted earlier, the temperature sensors 40, 50 of FIGS. 3 and 4 allow for improved temperature sensitivity even at lower power supply voltages than were permissible in the prior art (e.g., FIG. 1). However, in either of these circuits, increased sensitivities (higher $\partial V_{ref2}/\partial T$) also equate to higher output voltages (i.e., $V_{ref2}$), as shown by arrow A in FIG. 5. This means at some point, i.e., at lower temperatures, the output voltage may exceed the power supply voltage, Vdd, which is improper. It would therefore be beneficial to have a temperature sensor in which both magnitude and sensitivity (i.e., slope) were independently controllable. In this way, an increased sensitivity response (arrow A) could be brought back into range of the power supply voltage via a negative offset (arrow B), such that the temperature sensor has high sensitivity, and yet works within the entire desired operating temperature range. This would allow for an optimal temperature sensor, one in which the output voltage approaches Vdd at its lowest operating temperature and approaches zero at its highest operating temperature, as shown by arrow B, in FIG. 5.

Figure 6:
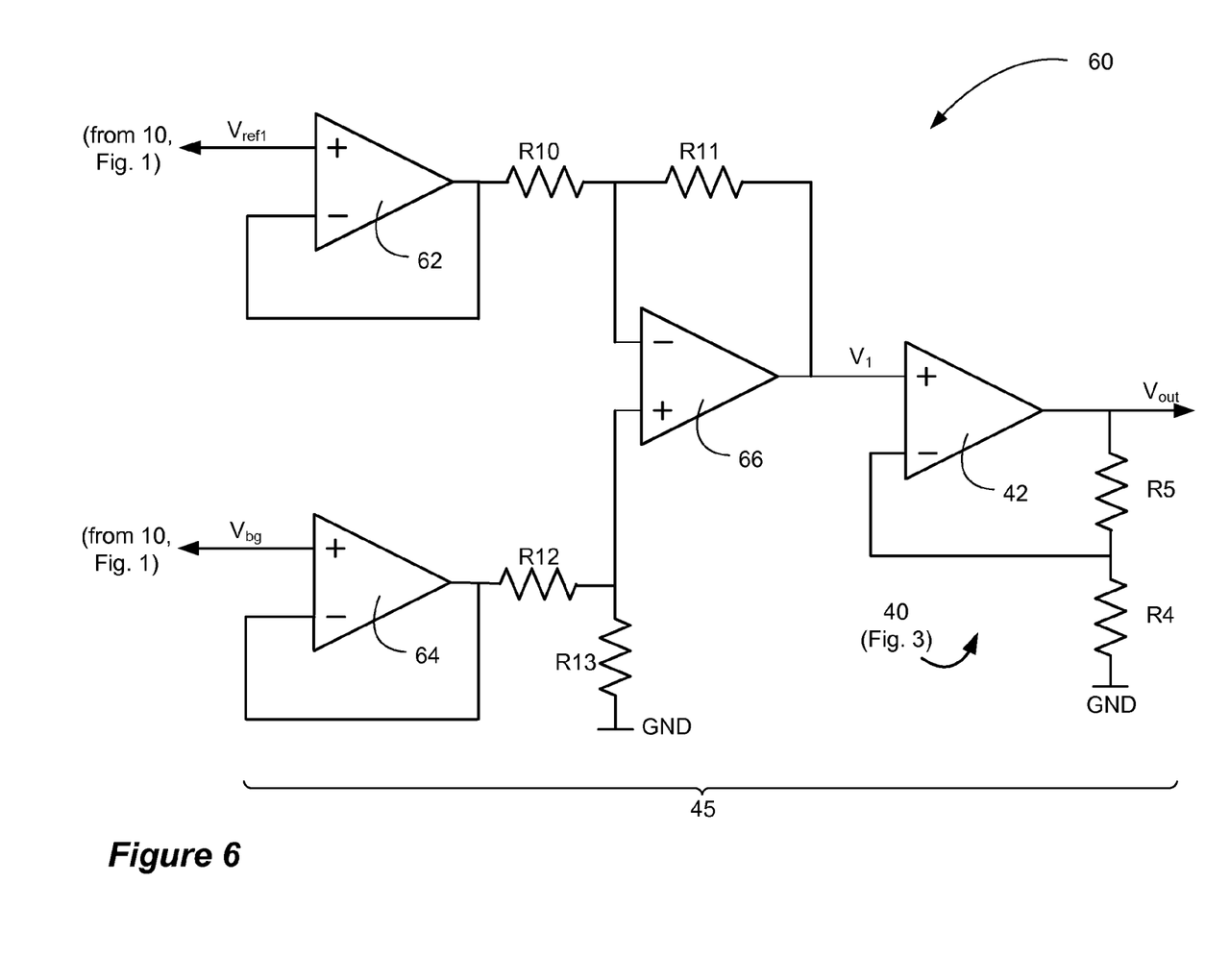
FIG. 6 illustrates another embodiment of a temperature sensor in which voltage output offset and sensitivity are independently controllable.

A temperature sensor 60 that achieves such optimal performance is shown in FIG. 6. This temperature sensor 60, like sensor 50 of FIG. 4, uses both the temperature-sensitive output from the input circuit 10 of FIG. 2 ($V_{ref1}$), and the non-temperature-sensitive output from the input circuit ($V_{bg}$). Central to the temperature sensor 60 of FIG. 6 is modification of the input voltage ($V_1$) to op amp 42 of FIG. 3, and in this regard note that the amplifier stage 40 of FIG. 3 is used as the last amplifier in FIG. 6. The modified input voltage, $V_1$, is related to the outputs $V_{ref1}$ and $V_{bg}$ of the input circuit 10 (FIG. 2) by the following equations:

$$V_1 = (R13*(R10+R11))/(R10*(R13+R12))*V_{ref1} - (R11/R10)V_{bg} \quad (12)$$

$$\partial V_1/\partial T = (R13*(R10+R11))/(R10*(R13+R12))*V_{ref1}/\partial T \quad (13)$$

As with $V_{out}$ of FIG. 4, $V_1$ of FIG. 6 is a function of $V_{ref1}$ and $V_{bg}$, although in this instance the $V_{bg}$ term allows a non-temperature-dependent offset ($(R11/R10)*V_{bg}$) to be subtracted from the temperature-dependent $V_{ref1}$ term. Moreover, $V_1$ can be tailored to a specific value via adjustment of the various resistor values R10 through R13. In one example, R10 is chosen to equal 2R11 and R13 is chosen to equal 2R12, in which case Equations (12) and (13) simplify to:

$$V_1 = V_{ref1} - (V_{bg}/2) \quad (14)$$

$$\partial V_1/\partial T = \partial V_{ref1}/\partial T \quad (15)$$

$V_1$ is input to an op amp 42 similar to that of FIG. 3, which has a voltage divider formed by resistors R4 and R5 on its output, $V_{out}$. This forms an amplifying scalar n as discussed earlier, such that:

$$V_{out} = (R5+R4)/R4 * V_1 = n*V_1 \quad (16)$$

$$\partial V_{out}/\partial T = n*\partial V_1/\partial T \quad (17)$$

where n=(R5+R4)/R4.

Figure 7:
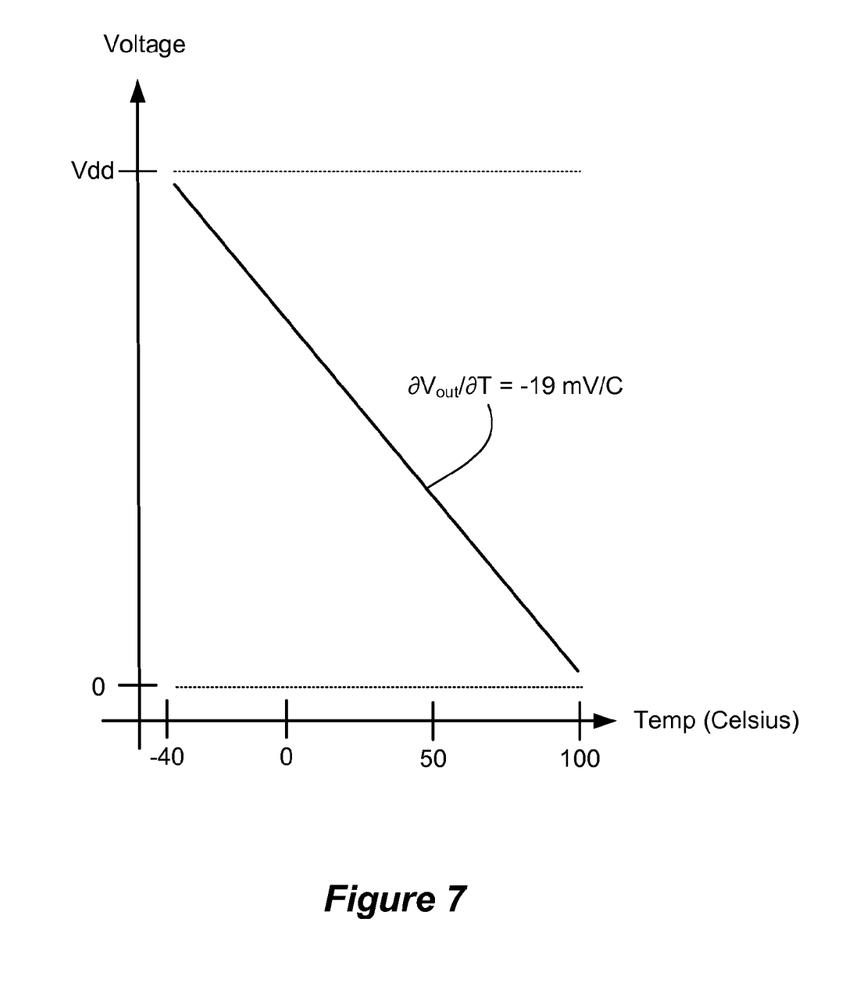
FIG. 7 graphically illustrates the output voltage for the temperature sensor of FIG. 6, and shows near ideal performance and maximum sensitivity for a given power supply voltage.

With these equations governing the temperature sensor 60 of FIG. 6 understood, it can be seen that $V_1$ and $\partial V_1/\partial T$ can be designed separately, and hence so can $V_{out}$ and $\partial V_{out}/\partial T$, i.e., the sensitivity of the temperature sensor 60. Thus, if we assume the resistor values R10 through R13 are chosen to arrive at equations (14) and (15) above, and if R4 and R5 are chosen to set n=10, the sensitivity of the temperature sensor 60, $\partial V_{out}/\partial T$, equals $n*\partial V_{ref1}/\partial T = 10*-1.9$ mV/C=-19 mV/C. Moreover, we see from the simulated results of FIG. 7 that the simulated design can be used with a power supply Vdd as low as 2.7V, and can produce essentially ideal output characteristics over a typical temperature operating range (bounded by -40 C and 100 C. in this example). Thus, as can be seen, at -40 C, the output voltage is approximately Vdd (i.e., greater than 95% of Vdd) and at 100 C, the output voltage is approximately ground (i.e., less than 5% of Vdd).

Were the prior art temperature sensor 10 of FIG. 1 used to provide the same sensitivity, its power supply voltage could not be run at such a low value, but would instead be on the order of at least 5V or more, much higher than current-day power supply voltages. The temperature sensor 60 of FIG. 6 thus marks a significant improvement, and one subject to much greater utility in modern-day low-power-supply integrated circuits. Additionally, because the design of the temperature sensor is flexible in both its output magnitude and sensitivity (slope), even lower power supply voltages can be accommodated, although of course gain factor n would need to be reduced accordingly were the same temperature range to be sensed.

It should be understood that the inventive concepts disclosed herein are capable of many modifications. To the extent such modifications fall within the scope of the appended claims and their equivalents, they are intended to be covered by this patent.

What is claimed is:

1. A temperature sensor, comprising:
    an input circuit, wherein the input circuit produces a first output voltage that varies predictably with temperature at a first temperature sensitivity and a second output voltage that does not vary with temperature; and
    an amplifier stage for receiving the first and second output voltages, wherein the amplifier stage produces a temperature sensor output with a second temperature sensitivity higher than the first temperature sensitivity, and wherein the amplifier stage allows the temperature sensor output to be offset by an amount that does not vary with temperature,
    wherein the first output voltage and the second output voltage are separated by a resistor in the input circuit.

2. The temperature sensor of claim 1, wherein the input circuit comprises a current mirror and P-N junctions that differ in their junction potentials, and further comprises resistors adjusted to produce the first and second output voltages.

3. The temperature sensor of claim 1, wherein the amplifier stage comprises a first operational amplifier for receiving the first output voltage, and a second operation amplifier for receiving the second output voltage.

4. The temperature sensor of claim 3, wherein the first operational amplifier amplifies the first temperature sensitivity to the second temperature sensitivity.

5. The temperature sensor of claim 4, wherein the second operational amplifier is used to produce the offset by the amount that does not vary with temperature.

6. The temperature sensor of claim 3, further comprising a third operational amplifier, wherein the third operational amplifier generates an intermediate voltage.

7. The temperature sensor of claim 6, further comprising a fourth operational amplifier, wherein the fourth operational amplifier receives the intermediate voltage and produces the temperature sensor output.

8. The temperature sensor of claim 1, wherein the input circuit is powered by a power supply voltage, wherein the temperature sensor is designed to operate within a temperature range from a first temperature to a second temperature, and wherein the temperature sensor output is approximately the power supply voltage at the first temperature, and wherein the temperature sensor output is approximately ground at the second temperature.

9. The temperature sensor of claim 1, wherein the amplifier stage comprises a first amplifier for receiving the first output voltage and a second amplifier for receiving the second output voltage, wherein outputs from the first and second amplifiers are used to create an intermediate voltage with an adjustable offset voltage; and a third amplifier for receiving the intermediate voltage and for producing the temperature sensor output.

10. The temperature sensor of claim 9, wherein the input circuit comprises a current mirror and P-N junctions that differ in their junction potentials, and further comprises resistors adjusted to produce the first and second output voltages.

11. The temperature sensor of claim 9, wherein the third amplifier amplifies the first temperature sensitivity to the second temperature sensitivity by a scalar.

12. The temperature sensor of claim 9, wherein the input circuit is powered by a power supply voltage, wherein the temperature sensor is designed to operate within a temperature range from a first temperature to a second temperature, and wherein the temperature sensor output is approximately the power supply voltage at the first temperature, and wherein the temperature sensor output is approximately ground at the second temperature.

13. The temperature sensor of claim 1, wherein the input circuit is operable at a power supply voltage; and wherein the temperature sensor output is approximately the power supply voltage at a first temperature, and wherein the temperature sensor output is approximately ground at a second temperature.

14. The temperature sensor of claim 13, wherein the first output voltage and the second output voltages are separated by a resistor in the input circuit.

15. The temperature sensor of claim 13, wherein the input circuit comprises a current mirror and P-N junctions that differ in their voltage drops, and further comprises resistors adjusted to produce the first and second output voltages.

16. A temperature sensor designed to operate within a temperature range from a first temperature to a second temperature, comprising:
an input circuit operable at a power supply voltage, wherein the input circuit produces a first output voltage that varies predictably with temperature at a first temperature sensitivity and a second output voltage that does not vary with temperature; and
an amplifier stage for receiving the first and second output voltages,
wherein the first temperature is lower than the second temperature, wherein the amplifier stage comprises a plurality of resistors and a plurality of amplifiers, wherein the amplifier stage outputs a temperature sensor output, wherein the temperature sensor output comprises a temperature sensitivity and an offset value, and wherein the temperature sensitivity and offset value are independently controllable via resistance values of the plurality of resistors.

17. The temperature sensor of claim 16, wherein the offset is not temperature dependent.

18. A temperature sensor, comprising:
an input circuit, wherein the input circuit produces a first output voltage that varies predictably with temperature at a first temperature sensitivity and a second output voltage that does not vary with temperature; and
an amplifier stage for receiving the first and second output voltages, wherein the amplifier stage produces a temperature sensor output with a second temperature sensitivity higher than the first temperature sensitivity, and wherein the amplifier stage allows the temperature sensor output to be offset by an amount that does not vary with temperature,
wherein the input circuit comprises a current mirror and P-N junctions that differ in their junction potentials, and further comprises resistors adjusted to produce the first and second output voltages.

19. The temperature sensor of claim 18, wherein the amplifier stage comprises a first operational amplifier for receiving the first output voltage, and a second operation amplifier for receiving the second output voltage.

20. The temperature sensor of claim 19, wherein the first operational amplifier amplifies the first temperature sensitivity to the second temperature sensitivity.

21. The temperature sensor of claim 20, wherein the second operational amplifier is used to produce the offset by the amount that does not vary with temperature.

22. The temperature sensor of claim 18, wherein the input circuit is powered by a power supply voltage, wherein the temperature sensor is designed to operate within a temperature range from a first temperature to a second temperature, and wherein the temperature sensor output is approximately the power supply voltage at the first temperature, and wherein the temperature sensor output is approximately ground at the second temperature.

23. The temperature sensor of claim 18, wherein the amplifier stage comprises a first amplifier for receiving the first output voltage and a second amplifier for receiving the second output voltage, wherein outputs from the first and second amplifiers are used to create an intermediate voltage with an adjustable offset voltage; and a third amplifier for receiving the intermediate voltage and for producing the temperature sensor output.

24. The temperature sensor of claim 23, wherein the first output voltage and the second output voltage are separated by a resistor in the input circuit.

25. The temperature sensor of claim 23, wherein the input circuit comprises a current mirror and P-N junctions that differ in their junction potentials, and further comprises resistors adjusted to produce the first and second output voltages.

26. The temperature sensor of claim 23, wherein the third amplifier amplifies the first temperature sensitivity to the second temperature sensitivity by a scalar.

27. A temperature sensor designed to operate within a temperature range from a first temperature to a second temperature, comprising:

an input circuit operable at a power supply voltage, wherein the input circuit produces a first output voltage that varies predictably with temperature at a first temperature sensitivity and a second output voltage that does not vary with temperature; and an amplifier stage for receiving the first and second output voltages, wherein the amplifier stage outputs a temperature sensor output, wherein the temperature sensor output is approximately the power supply voltage at the first temperature, wherein the temperature sensor output is approximately ground at the second temperature, and wherein the first temperature is lower than the second temperature, wherein the first output voltage and the second output voltages are separated by a resistor in the input circuit.

28. A temperature sensor designed to operate within a temperature range from a first temperature to a second temperature, comprising:

an input circuit operable at a power supply voltage, wherein the input circuit produces a first output voltage that varies predictably with temperature at a first temperature sensitivity and a second output voltage that does not vary with temperature; and an amplifier stage for receiving the first and second output voltages, wherein the amplifier stage outputs a temperature sensor output, wherein the temperature sensor output is approximately the power supply voltage at the first temperature, wherein the temperature sensor output is approximately ground at the second temperature, and wherein the first temperature is lower than the second temperature, wherein the input circuit comprises a current mirror and P-N junctions that differ in their junction potentials, and further comprises resistors adjusted to produce the first and second output voltages.

\* \* \* \* \*

UNITED STATES PATENT AND TRADEMARK OFFICE
CERTIFICATE OF CORRECTION

PATENT NO.         : 8,540,423 B2
APPLICATION NO.    : 12/147008
DATED              : September 24, 2013
INVENTOR(S)        : Liu Page 1 of 1

It is certified that error appears in the above-identified patent and that said Letters Patent is hereby corrected as shown below:

In the Claims

Column 6, line 66, in Claim 3, delete "operation" and insert -- operational --, therefor.

Column 8, line 31, in Claim 19, delete "operation" and insert -- operational --, therefor.

Signed and Sealed this
Twenty-sixth Day of November, 2013

Margaret A. Focarino
*Commissioner for Patents of the United States Patent and Trademark Office*